US006435477B2

(12) United States Patent
Brunnhoelzl

(10) Patent No.: US 6,435,477 B2
(45) Date of Patent: Aug. 20, 2002

(54) JACK APPARATUS

(75) Inventor: George Brunnhoelzl, Mooresville, NC (US)

(73) Assignee: Brunnhoelzl Racing, Inc., Mooresville, NC (US)

( * ) Notice: Subject to any disclaimer, the term of this patent is extended or adjusted under 35 U.S.C. 154(b) by 0 days.

(21) Appl. No.: 09/726,361

(22) Filed: Nov. 30, 2000

Related U.S. Application Data

(60) Provisional application No. 60/167,369, filed on Nov. 30, 1999.

(51) Int. Cl.[7] .................................................. B60P 1/48

(52) U.S. Cl. ................................. 254/8 B; 254/DIG. 4

(58) Field of Search ................................ 254/8 B, 9 B, 254/10 B, 7 B, DIG. 1, DIG. 4, 124, 131

(56) References Cited

U.S. PATENT DOCUMENTS

| | | | | |
|---|---|---|---|---|
| 2,552,965 A | * | 5/1951 | Harris | 254/8 B |
| 3,181,836 A | * | 5/1965 | Arnes et al. | 254/8 B |
| 4,210,314 A | * | 7/1980 | Carroll et al. | 254/8 B |
| 4,289,299 A | * | 9/1981 | Kameda | 254/8 B |
| 5,201,494 A | * | 4/1993 | Lundman | 254/8 B |
| 5,261,641 A | * | 11/1993 | Ployer | 254/8 B |
| 6,264,169 B1 | * | 7/2001 | Hung | 254/8 B |

* cited by examiner

*Primary Examiner*—Robert C. Watson
(74) *Attorney, Agent, or Firm*—Dilworth & Barrese, LLP

(57) ABSTRACT

A jack apparatus that includes a pair of side support plates with a reduced distal end side profile, a lifting mechanism configured to fit between the distal end of the side support plates when the lifting mechanism is at the lower limit of its range of motion and seen from a side view. In addition, the jack apparatus includes a specialized lift plate for engaging the lift point of a vehicle. The side support plates contain a distal end side profile that includes a first angle, a horizontal portion, and a second angle that are configured to enable the distal end of the jack apparatus to fit under the chassis of a car when it is close to the ground as a result of a flat tire or a suspension malfunction, for example. The lift plate is configured with a distal end portion that contains a tapered slot that allows the lift point of the vehicle to be engaged from an approximately horizontally angle and guides it towards a proximal end recess that retains the lift point in position during lifting.

11 Claims, 4 Drawing Sheets

200
212
234
223
222

222
200
220
250
212
214

JACK APPARATUS

This application claims priority from U.S. Provisional Application Ser. No. 60/167,369 filed Nov. 30, 1999 which is incorporated herein in its entirety by reference. U.S. Pat. Nos. 5,531,279, 5,377,769, 5,303,781,5,228,523 and U.S. patent application Ser. No. 08/617,040 are also incorporated herein by reference.

BACKGROUND

1. Technical Field

The present disclosure relates to an apparatus for the lifting of vehicles. More particularly, the present disclosure relates to a jack for elevating a chassis of a vehicle.

2. Background of Related Art

Jacks are widely used to elevate the chassis of an automotive vehicle in a variety of environments. The lift plate of the typical prior art jack apparatus is positioned beneath a lift point on the chassis and the jack is actuated to raise the vehicle for the replacement of a flat tire, for example. Problems with jacks occur, however, when maintenance needs to be performed on the vehicle and the distance between the chassis of the vehicle and the ground is less than the distance from the lift plate of the jack, positioned at the lower limit of its range of motion, and the ground. In this all too common situation, the prior art jack apparatus cannot be positioned under the chassis to perform the repair without additional effort expended by a motorist or pit crew to lift the car above the lift plate of the jack. This kind of scenario can occur as a result of a simple flat tire and can be compounded by uneven ground, a worn suspension system, a low clearance configuration of the chassis relative to the ground, wheel size, location of the lift point in relation to the outside edge of the chassis, and loading of the vehicle.

FIGS. 1 and 2 illustrate a conventional jack shown generally as 200. Jack 200 includes an actuation lever 234, a pair of side support plates 212, a lift arm 220, a stabilizing arm 250, a lift plate 222, and a roller 214. Actuation lever 234 is positioned at the proximal end of jack 200 and roller 214 is positioned at the distal end. Side support plates 212 include a linear upper edge which slopes downwardly at an angle beginning near the proximal end of jack 200 and extending to the distal end of jack 200. A proximal pivot member for lift arm 220 and stabilizing arm 250 is supported between side support plates 212.

The configuration of support plate 212, lift arm 220, and stabilizing arm 250 of jack 200 results in the distal portion of lift plate 222 protruding above side support plates 212 when lift arm 220 is positioned at the lower limit of its range of motion. The height of lift plate 222 above ground in combination with its position relative to side support plates 212 makes it difficult in many circumstances to position jack 200 under the chassis of a vehicle. The lowest position of lift plate 222 also places stabilizing arm 250 below side plates 212 adjacent the ground. This makes the lowest position of jack 200 vulnerable to undulations in the ground or variations in a gravel surface. In addition, lift plate 222 contains a lip 223 that further limits its application by necessitating that the added height of lip 223 clear the lift point of the vehicle for proper vertical positioning beneath the lift point of the chassis.

Jack 200 is also constrained by the angle of side support plates 212 when interior lift points of a vehicle are inset from the edge of the chassis. Under these circumstances, lift plate 222 may fit under the vehicle, but the angle of side support plate 212 can preclude jack 200 from extending far enough under the vehicle to reach the lift point. Thus, the configuration of the prior art jack is distinctly limited in its ability to gain access beneath a vehicle and consistently engage the lift points of a vehicle chassis to perform its intended function.

A continuing need exists for a jack configuration that minimizes the height between the ground and lift plate and supports accessing the lift point of a chassis from an approximately horizontal direction in order to increase its ability to lift an automotive chassis under adverse circumstances when the height of the chassis of a vehicle is close to the ground.

SUMMARY

A jack apparatus is provided that includes a unique lifting mechanism and side support plate configuration which allows a heretofore unachievable reduction in the height of the lift plate when it is at the lower limit of its range of motion. The side support plate includes a first angled portion that tapers towards the ground, a horizontal portion, and a second angle that further reduces the height of the distal end of the jack and thereby supports the installation of the jack between the chassis and the ground when the chassis of a vehicle is low to the ground. When the lifting mechanism is positioned at the lowest limit of its range of motion, the totality of the lifting mechanism is positioned beneath and between the side support plates. In addition, the lift plate includes a tapered guide channel which enables the jack to be self-aligning during placement of the jack beneath the chassis of a vehicle.

The invention, together with attendant advantages, will be best understood by reference to the following detailed description of the invention when used in conjunction with the figures below.

BRIEF DESCRIPTION OF THE DRAWINGS

Preferred embodiments of the presently disclosed jack apparatus are described herein with reference to the drawings, wherein.

DETAILED DESCRIPTION OF THE PREFERRED EMBODIMENTS

Figures 1, 2:
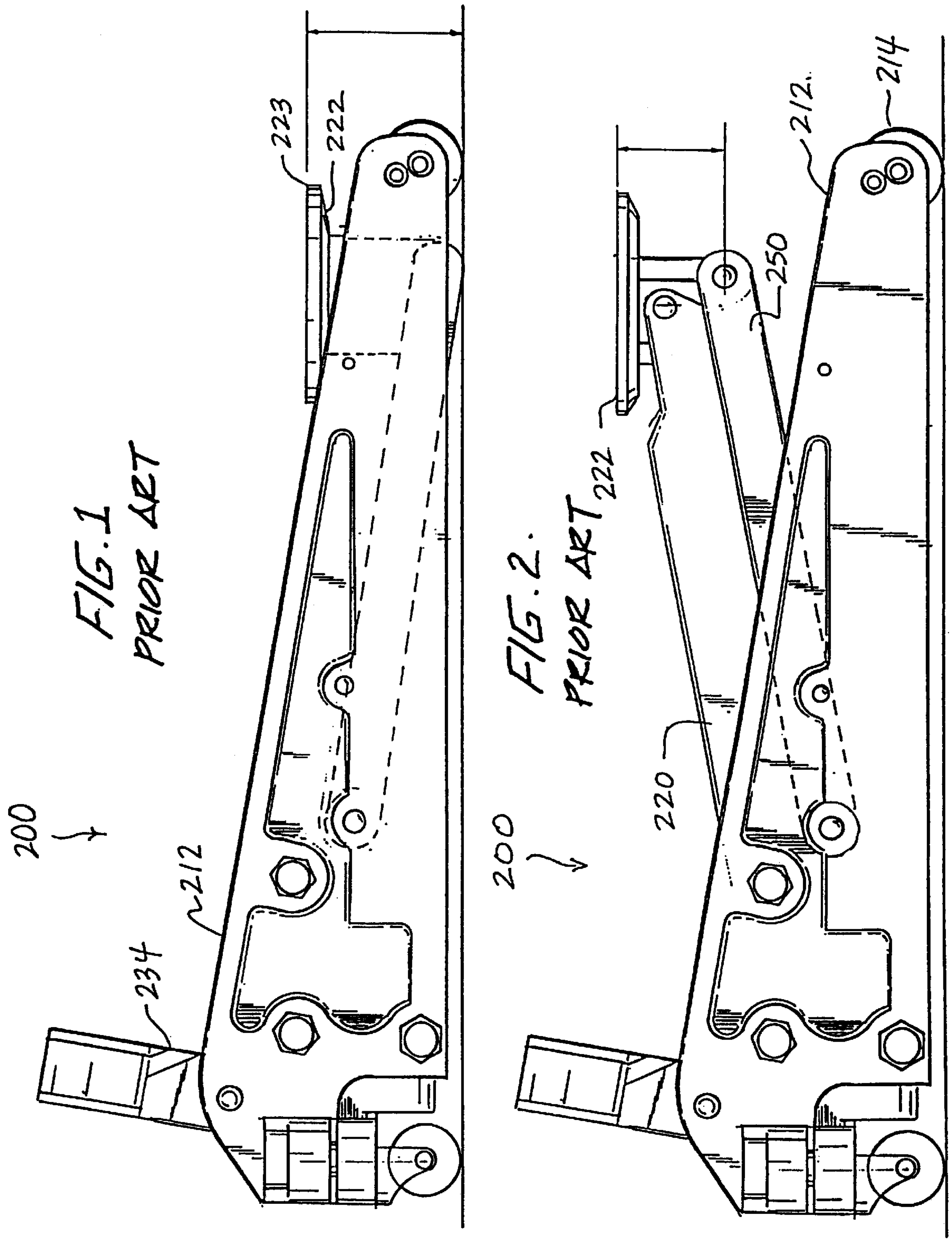
FIG. 1 PRIOR ART
FIG. 2. PRIOR ART
FIG. 1 is a side view of the prior art jack with the lift arm in a lowered position.
FIG. 2 is a side view of the prior art jack with the lift arm in an elevated position.
Figure 3:
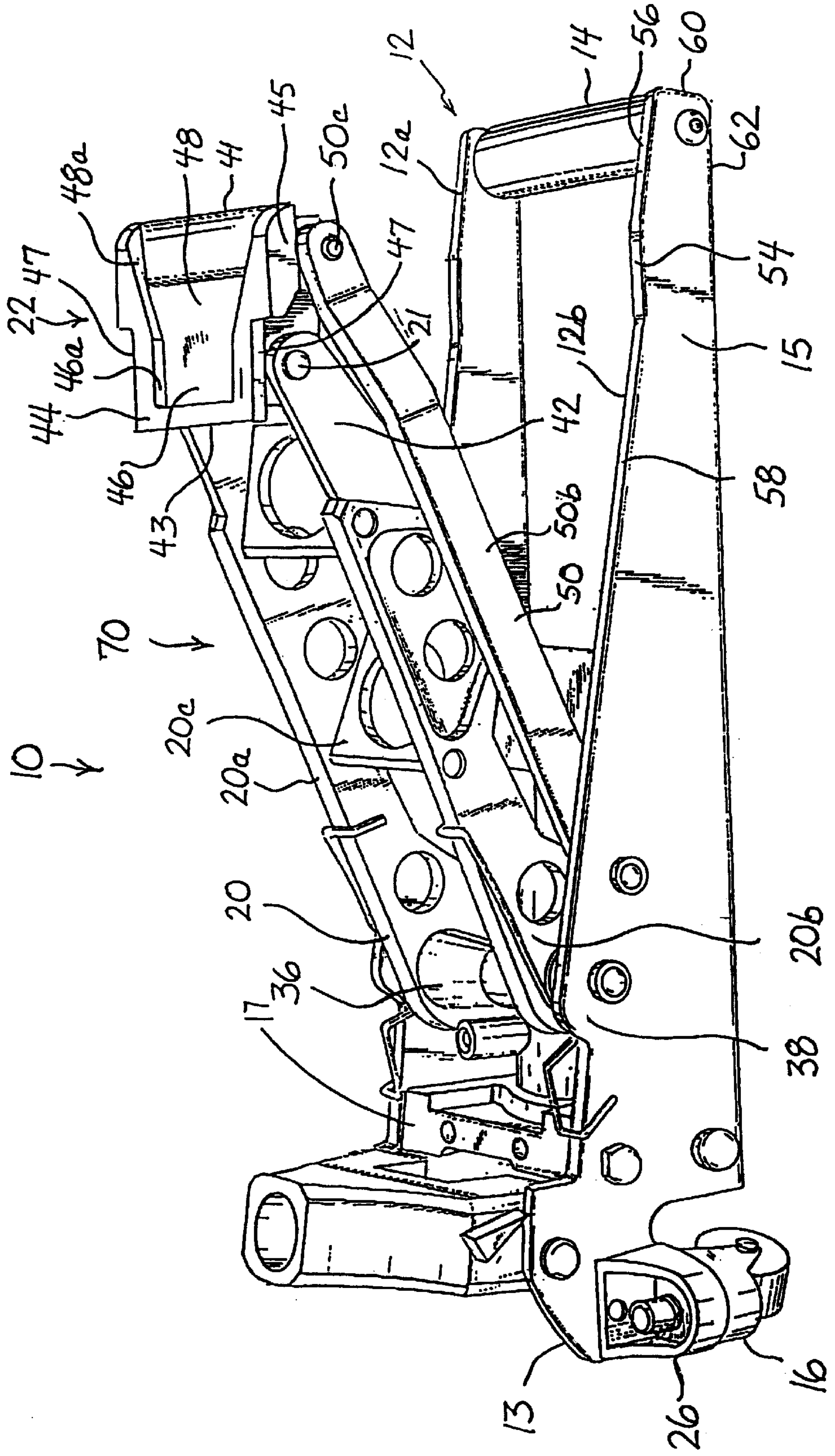
FIG. 3 is a perspective view of one embodiment of the presently disclosed jack apparatus as constructed in accordance with the present disclosure.

Referring now in specific detail to the drawings in which like reference numerals identify similar or identical elements throughout the several views, and initially to FIG. 3, one preferred embodiment of jack apparatus 10 includes a support plate structure 12, a front roller 14, a pair of rear caster wheels 16, and a lifting mechanism 70. Jack apparatus 10 has a proximal end 13 and a distal end 15.

Support plate structure 12 includes a first support plate 12*a* and a second support plate 12*b* which are secured in spaced relation by roller 14 on distal end 15 and support block 17 at proximal end 13. Support plates 12*a* and 12*b* have a unique distal end 15 profile that includes a first angled portion 56, a horizontal portion 54, a second angled portion 58, distal edge 60, and bottom edge 62. When jack 10 is in a first position, wherein the elevation of jack 10 lift mechanism 70 is placed at its lowest limit, lift mechanism 70 is positioned completely within the horizontal profile of the distal end of side support plates 12*a* and 12*b* when seen from a side view.

In a preferred embodiment, jack 10 has an overall length of about 24 inches, a front roller height of about 1.5 inches, and a lift plate height of about 2 inches when the lift mechanism is at the lower limit of its range of motion. The forward end or uppermost point of distal edge 60 of each of side support plates 12*a* and 12*b* has a height of about 1.3 inches. Distal edge 60 ramps up as a result of first angle 56 to a height of about 2 inches in the area adjacent lift plate 22. Preferably, side support plates 12*a*, 12*b* have a horizontal portion 54 adjacent lift plate 22. Alternately, the dimensions of the jack may be varied to suit different operational needs.

Lifting mechanism 70 includes a lift arm 20, a lift plate 22, and a pair of stabilizing arms 50. Lift arm 20 is rotatably secured between first and second side support plates 12*a* and 12*b* about a rod 36 positioned adjacent an upper proximal end 38 of support plate structure 12. Lift arm 20 includes a plurality of central support members 20*c* which are secured between side frame members 12*a* and 12*b*. Lift plate 22 is positioned on a distal end 42 of lift arms 20*a* and 20*b*.

A pair of stabilizing arms 50 are positioned adjacent the outer side surface of side frame members 20*a* and 20*b*. Stabilizing arms 50 include a first and second stabilizing arms 50*a* (not shown) and 50*b*. Stabilizing arms 50*a* and 50*b* are pivotably secured near their respective proximal ends to side support plates 12*a* and 12*b* and near their distal ends with lift plate 22 using a pin 50*c*. Pin 50*c*, in combination with stabilizing arms 50, provides structural support for the distal end of lift plate 22. A second pivot member 21 pivotably connects the proximal end of lift plate 22 to the distal end of lift arms 20*a* and 20*b* to provide the additional function of sustaining lift plate 22 in an orientation that is approximately parallel to the to edge 62 of support plates 12*a* and 12*b* during its operational movement.

Lift plate 22 has a distal end 41, a proximal end 43, and two opposing sides 45. As discussed above, proximal end 43 is pivotally connected to lift arms 20*a* and 20*b* by a pin 21 and the distal end 41 is pivotally connected to stabilizing arms 50 by pin 50*c*. Lift arm 20 provides the primary structural support for lift plate 22. Lift plate 22 includes a planar top surface 44 having a rectangular recess 46 formed therein defined by sidewalls 46*a* and having a first depth. A trapezoidal shaped groove or recess 48 having a second depth extends distally from rectangular recess 46. The first depth of rectangular recess 46 is greater than the second depth of trapezoidal recess 48.

Trapezoidal recess 48 forms a converging tapered guide channel for the chassis lift point leading into rectangular recess 46. The distal end of recess 48 is angled downwardly and extends through the forward end of lift plate 22. Trapezoidal recess 48 functions to properly guide the forward end of jack 10 in relation to a chassis lift point by slidingly receiving the lift point of a chassis as jack 10 is positioned beneath a vehicle in an approximately horizontal direction. Thereafter, sidewalls 48*a* provide a self-aligning function that guides the lift point along trapezoidal recess 48 into deeper rectangular recess 46 where the vehicular lift point is preferably retained during lifting.

In addition, each side 45 of proximal end 43 of lift plate 22 includes a cut-out portion 47. Cut-out portions 47 allow proximal end 43 to be positioned in a low profile configuration, between the distal end 42 of lift arms 20*a* and 20*b*, when lift arm 20 is in a lower portion of its range of motion.

Front roller 14 is rotatably secured between the forward end of support plates 12*a* and 12*b* about a support rod 24. Each of the pair of caster wheels 16 are secured to the rear end of support plates 12*a* and 12*b* by a mounting block 26.

Figure 4:
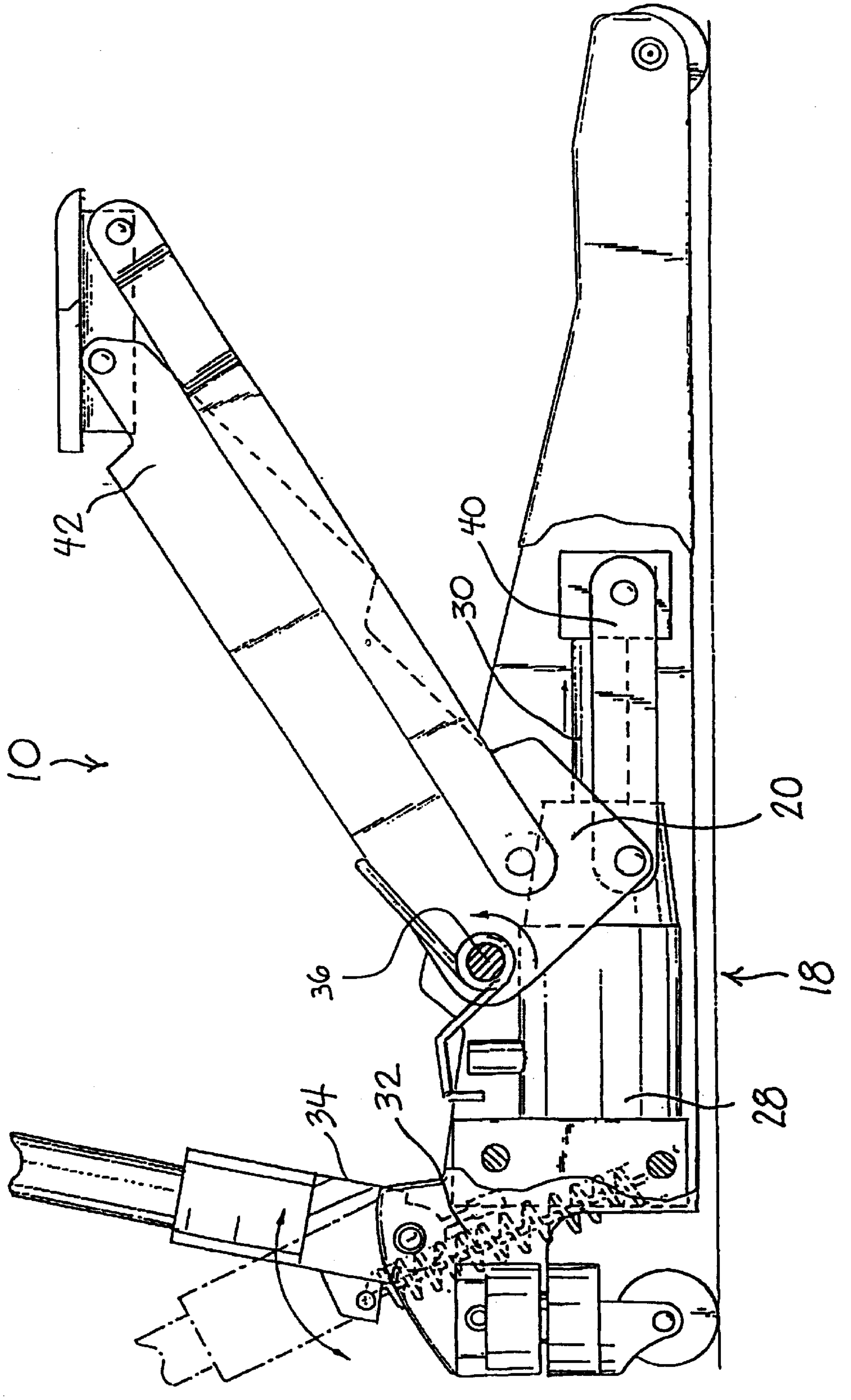
FIG. 4 is a partial cut-away side view of the jack apparatus shown in FIG. 3 illustrating the piston assembly and the lift mechanism as constructed in accordance with the present disclosure.

FIG. 4 illustrates piston assembly 18 which includes piston cylinder 28, piston 30, plunger 32, link arm 40 and actuation lever 34. Piston assembly 18 is preferably a hydraulic based mechanism. Alternately, other drive assemblies may be used including, for example, electric or pneumatic drive mechanisms. Actuation lever 34 has an abutment wheel rotatably secured thereto which is movable into contact with an engagement end of plunger 32 to urge plunger 32 into piston cylinder 28. A first end of piston 30 is slidably positioned within piston cylinder 28. When plunger 32 is urged into cylinder 28, piston 30 is hydraulically extended from piston cylinder 28.

Link arm 40 has one end attached to a lower proximal end of lift arm 20 and the other end connected to a second end of piston 30. When piston 30 is extended outwardly of piston cylinder 28, link arm 40 pulls the lower proximal end of lift arm 20 to rotate lift arm 20 about rod 36, thus raising the distal end 42 of lift arm 20.

Figure 5:
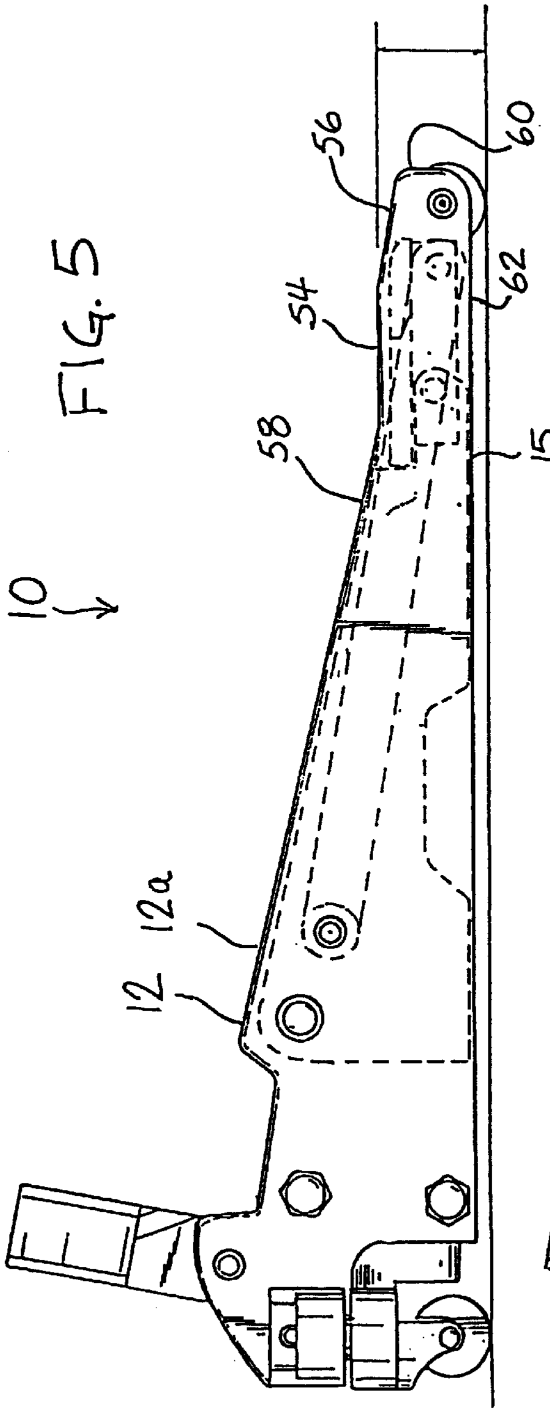
FIG. 5 is a side view of the jack apparatus shown in FIG. 3 with the lift arm in a lowered position.
Figure 6:
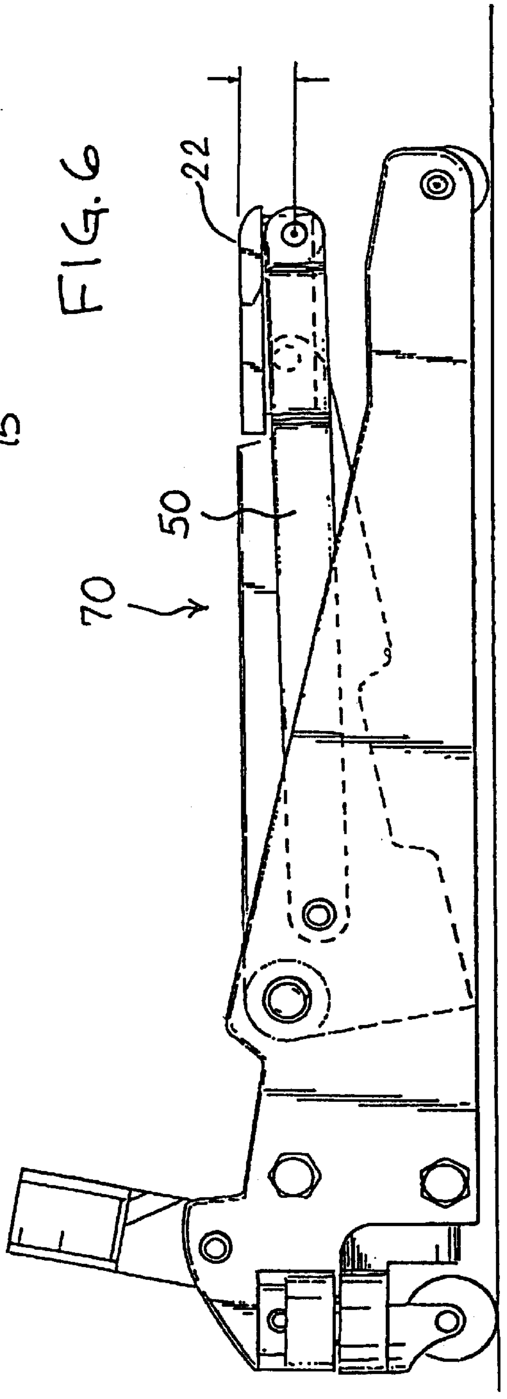
FIG. 6 is a side view of the jack apparatus shown in FIG. 3 with the lift arm in an elevated position.

In FIGS. 5 and 6, jack 10, as described herein, contains a uniquely shaped support plate structure 12 in combination with a novel lift mechanism and lift plate 22 that is configured to enable jack 10 to engage the lift point of a vehicle chassis when there is reduced clearance between the ground and the lift point.

The configuration of the distal end of side support side plates 12*a* and 12*b* with first angled portion 56, horizontal portion 54, second angled portion 58, distal edge 60, and bottom edge 62 forms a uniquely low profile that minimizes the height of distal end 15 of jack 10 and has the function of enabling jack apparatus 10 to access vehicular lift points that would be unaccessible to other jacks.

Lift mechanism 70, including lift arm 20, stabilizing arms 50, and lift plate 22, is configured to have a low profile at distal end 15 when jack 10 is at its lower limit of range of motion. The reduced profile of lift mechanism 70 fits within dimensions of the reduced profile of side support plates 12*a* and 12*b* when seen from a side view. As a result of lift plate 22, lift arm 20, and stabilizing arms 50 being positioned within the limits of the horizontal profile of side plates 12*a* and 12*b*, jack 10 requires only minimal clearance between the chassis of a vehicle and the surface upon which the vehicle is supported to be positioned beneath the lift point of the chassis.

The various components of jack 10 can be constructed from any materials meeting the requisite strength requirements. Preferably, the components are constructed from stainless steel and/or cast aluminum.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. For example, the dimensions of the jack may be varied to better suit a particular application. Accordingly, all such changes and modifications are intended to be included within the scope of the appended claims.

What is claimed is:

1. A jack apparatus comprising:

a frame including a pair of side support plates, each side support plate having an upper edge;

a lift arm pivotably supported between the side support plates;

a lift plate supported on a distal end of the lift arm; and a drive assembly operatively connected to the lift arm, the drive assembly being actuable to pivot the lift arm between a first position wherein the lift plate is positioned below the upper edge of each of the side support plates, and a second position wherein the lift plate is raised to an elevated position above the upper edges of the side support plates; wherein the upper edge of each of the side support plates has a distal end with a first angled portion, a horizontal portion and second angled portion, wherein the first angled portion extends upwardly from one end of the horizontal portion and the second angled portion extends downwardly from the other end of the horizontal portion.

2. A jack according to claim 1, wherein the lift plate includes a guide channel, the guide channel being configured to self-align the jack in relation to an automobile chassis during placement of the jack beneath the automobile chassis.

3. A jack according to claim 2, wherein the guide channel includes a tapered forward end.

4. A jack according to claim 1, wherein the lift plate is positioned between the horizontal portions of the sideplates when the lift plate is in the first position.

5. A jack apparatus comprising:

a frame including a pair of side support plates, an upper edge of each of the side support plates having a distal end with at least one angled portion extending from the distal end toward a proximal end, and a horizontal portion extending from the at least one angled portion towards the proximal end;

a lift arm pivotably supported between the side support plates;

a lift plate supported on a distal end of the lift arm; the lift plate having a distal end with a guide channel configured to provide self-alignment of the jack in relation to an automobile during placement of the jack beneath the automobile; and a drive assembly operatively connected to the lift arm, the drive assembly being actuable to pivot the lift arm.

6. A jack apparatus comprising:

a pair of side support plates each having a proximal end and a distal end and an upper edge, the upper edge having a first angled portion, a horizontal portion and a second angled portion;

a piston assembly positioned between the side support plates and driven by an actuation lever, the piston assembly being connected with and providing a force to a link arm; and a lift mechanism operably connected to and moved by the link arm, the lift mechanism including a lift arm that is rotatably connected between the side support plates, the lift mechanism further including a lift plate positioned on the distal end of the lift arm, wherein the piston assembly is actuable to move the lift plate between a first position and a second position, wherein in the first position, the lift plate is positioned between and below the upper edges of the side support plates and in the second position, the lift plate is positioned above the upper edges of the side support plates.

7. A jack according to claim 6, wherein the first angled portion extends downwardly from one end of the horizontal portion and the second angled portion extends upwardly from the other end of the horizontal portion.

8. A jack according to claim 7, wherein the height of the horizontal portion of the distal end of the side support plates is less than approximately 2.5 inches above the ground.

9. A jack according to claim 7, wherein the height of the lift plate is approximately two inches above the ground when the lifting mechanism is in the first position.

10. A jack according to claim 6, wherein each side support plate includes a distal edge, the height of the distal edge of each of the side support plates being less than 1.4 inches above the ground.

11. The jack of claim 6, wherein a roller is positioned between the distal ends of the side support plates and at least two wheels are mounted to the proximal end of the side support plates.

* * * * *